United States Patent
Mestav et al.

(10) Patent No.: US 12,341,589 B2
(45) Date of Patent: Jun. 24, 2025

(54) TRANSFORMER-BASED DECODER FOR CHANNEL STATE INFORMATION COMPRESSION, AND RELATED DEVICES, METHODS, AND COMPUTER PROGRAMS

(71) Applicant: Nokia Solutions and Networks Oy, Espoo (FI)

(72) Inventors: Kursat Mestav, Gloucester, VA (US); Yunchou Xing, Naperville, IL (US); Dani Johannes Korpi, Espoo (FI); Iraja Saniee, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/926,068

(22) Filed: Oct. 24, 2024

(65) Prior Publication Data

US 2025/0150140 A1    May 8, 2025

(30) Foreign Application Priority Data

Nov. 3, 2023  (FI) .................................. 20236230

(51) Int. Cl.
  *H04B 7/06* (2006.01)
  *H04B 7/0413* (2017.01)
  *H04L 41/16* (2022.01)

(52) U.S. Cl.
  CPC ......... *H04B 7/0626* (2013.01); *H04B 7/0413* (2013.01); *H04L 41/16* (2013.01)

(58) Field of Classification Search
  CPC ...... H04B 7/0626; H04B 7/0413; H04L 41/16
  See application file for complete search history.

(56) References Cited

U.S. PATENT DOCUMENTS

| | | | |
|---|---|---|---|
| 2023/0118031 A1* | 4/2023 | Cai ....................... | H04L 1/0026 706/25 |
| 2024/0030989 A1* | 1/2024 | Kim ..................... | H04B 7/0626 |
| 2024/0088965 A1* | 3/2024 | Kheirkhah Sangdeh .................... H04B 7/0626 |

FOREIGN PATENT DOCUMENTS

| | | |
|---|---|---|
| CN | 115865145 A | 3/2023 |
| WO | 2022/271073 A1 | 12/2022 |
| WO | 2023193570 A1 | 10/2023 |
| WO | 202/3206466 A1 | 11/2023 |

OTHER PUBLICATIONS

Dosovitskiy et al., "An Image is Worth 16×16 Words: Transformers for Image Recognition at Scale", International Conference on Learning Representations (ICLR), May 3-7, 2021, pp. 1-21.
"Lutz Roeder", lutzroeder, Retrieved on Oct. 18, 2024, Webpage available at : https://www.lutzroeder.com/projects/.

(Continued)

*Primary Examiner* — Fred A Casca
(74) *Attorney, Agent, or Firm* — Nokia Technologies Oy

(57) ABSTRACT

Devices, methods and computer programs for a transformer-based decoder for channel state information compression are disclosed. At least some example embodiments may allow at least some of the example embodiments described herein may allow a lightweight general purpose, high-fidelity, and data-driven decoder for channel state information (CSI) array compression associated with massive multiple-input and multiple-output (MIMO).

12 Claims, 5 Drawing Sheets

(56) References Cited

OTHER PUBLICATIONS

Lu et al., "Multi-resolution CSI Feedback with Deep Learning in Massive MIMO Syste", IEEE International Conference on Communications (ICC), Jun. 7-11, 2020, 6 pages.
Wen et al., "Deep Learning for Massive MIMO CSI Feedback", IEEE Wireless Communications Letters, vol. 07, No. 05, Oct. 2018, pp. 748-751.
Yang et al., "Deep Convolutional Compression for Massive MIMO CSI Feedback", IEEE 29th International Workshop on Machine Learning for Signal Processing (MLSP), Oct. 13-16, 2018, 6 pages.
Xu et al., "Transformer Empowered CSI Feedback for Massive MIMO Systems", 30th Wireless and Optical Communications Conference (WOCC), Oct. 7-8, 2021, pp. 157-161.
"Evaluation of ML for CSI feedback enhancement", 3GPP TSG RAN WG1 #113, R1-2304681, Agenda: 9.2.2.1, Nokia, May 22-26, 2023, 31 pages.
"Evaluation of ML for CSI feedback enhancement", 3GPP TSG RAN WG1 #112 Meeting, R1-2300604, Agenda: 9.2.2.1, Nokia, Feb. 27-Mar. 3, 2023, 26 pages.
U.S. Appl. No. 63/517,061, "CSI Compression and Decompression", filed on Aug. 1, 2023, pp. 1-43.
Office action received for corresponding Finnish Patent Application No. 20236230, dated Mar. 27, 2024, 9 pages.
"Evaluation on AI/ML for CSI feedback enhancement", 3GPP TSG RAN WG1 #114, R1-2306832, Agenda: 9.2.2.1, Intel Corporation, Aug. 21-25, 2023, pp. 1-19.
Cui et al., "TransNet: Full Attention Network for CSI Feedback in FDD Massive MIMO System", IEEE Wireless Communications Letters, vol. 11, No. 05, May 2022, pp. 903-907.
Office action received for corresponding Finnish Patent Application No. 20236230, dated Aug. 19, 2024, 6 pages.
Extended European Search Report received for corresponding European Patent Application No. 24208827.6, dated Mar. 24, 2025, 8 pages.

* cited by examiner

TRANSFORMER-BASED DECODER FOR CHANNEL STATE INFORMATION COMPRESSION, AND RELATED DEVICES, METHODS, AND COMPUTER PROGRAMS

RELATED APPLICATION

This application claims benefit of priority from Finnish Patent App. No. 20236230, filed Nov. 3, 2023, the disclosure of which is hereby incorporated in its entirety by reference herein.

TECHNICAL FIELD

The disclosure relates generally to communications and, more particularly but not exclusively, to a transformer-based decoder for channel state information compression, as well as related devices, methods, and computer programs.

BACKGROUND

In fifth-generation (5G) wireless networks, channel state information (CSI) comprises parameters related to the state of a channel. The CSI parameters may include, e.g., a channel quality indication (CQI), precoding matrix indices (PMIs) with different codebook sets, and/or a rank indicator (RI). A network node, such as a base station may send a CSI reference signal (CSI-RS) towards a user device, and the user device may use the CSI-RS to measure and compute the CSI parameters. Then, the user device may report these CSI parameters to the network node as CSI feedback. Upon receiving the CSI parameters, the network node may, e.g., schedule downlink data transmissions with attributes such as a modulation scheme, a code rate, beam directions, a number of transmission layers, and/or a multiple-input and multiple-output (MIMO) precoding.

Massive MIMO may significantly improve system performance in wireless networks. However, since massive MIMO involves providing base stations with a very large number of antennas, the dimensions of the CSI feedback are high, and therefore feedback overhead may be significant.

Accordingly, at least in some situations, there may be a need to reduce the feedback overhead while still maintaining feedback accuracy, for example.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a decoder device comprises at least one processor, and at least one memory storing instructions that, when executed by the at least one processor, cause the decoder device at least to obtain a transmission bitstream from a radio transmission over a channel state information, CSI, feedback channel between a user device and a network node. The transmission bitstream comprises an encoded representation of massive multiple-input and multiple-output, MIMO, associated original CSI feedback data compressed and transmitted by the user device. The instructions, when executed by the at least one processor, further cause the decoder device at least to generate a reconstructed representation of the original CSI feedback data based on the obtained encoded representation of the original CSI feedback data. The generation of the reconstructed representation of the original CSI feedback data is performed by applying a decoder portion of an autoencoder neural network to the obtained encoded representation of the original CSI feedback data to decompress and postprocess the obtained encoded representation of the original CSI feedback data. The decoder portion comprises a transformer with a multi-head attention block to improve decoding accuracy.

In an example embodiment, alternatively or in addition to the above-described example embodiments, the decoder portion further comprises a partially or fully connected first linear layer before the transformer, configured to reshape input data of the decoder portion and generate linear embeddings for the transformer.

In an example embodiment, alternatively or in addition to the above-described example embodiments, the transformer comprises a layer normalization block.

In an example embodiment, alternatively or in addition to the above-described example embodiments, the transformer further comprises a residual skip connection (423) from an output of the first linear layer to an output of the multi-head attention block.

In an example embodiment, alternatively or in addition to the above-described example embodiments, the decoder portion further comprises a non-linear activation function after the transformer.

In an example embodiment, alternatively or in addition to the above-described example embodiments, the decoder portion further comprises a partially or fully connected second linear layer after the transformer, configured to reshape output data of the decoder portion.

In an example embodiment, alternatively or in addition to the above-described example embodiments, the decoder portion further comprises a post-processing function after the second linear layer, configured to convert real and imaginary values to complex values.

In an example embodiment, alternatively or in addition to the above-described example embodiments, the instructions, when executed by the at least one processor, further cause the decoder device to train the decoder portion of the autoencoder neural network using data collected from multiple different encoder portions of the autoencoder neural network as training data.

In an example embodiment, alternatively or in addition to the above-described example embodiments, the instructions, when executed by the at least one processor, further cause the decoder device to obtain a unique label of an encoder portion of the autoencoder neural network as an additional input to the decoder portion.

An example embodiment of a method comprises obtaining, by a decoder device, a transmission bitstream from a radio transmission over a channel state information, CSI, feedback channel between a user device and a network node. The transmission bitstream comprises an encoded representation of massive multiple-input and multiple-output, MIMO, associated original CSI feedback data compressed and transmitted by the user device. The method further comprises generating, by the decoder device, a reconstructed representation of the original CSI feedback data based on the obtained encoded representation of the original CSI feedback data. The generation of the reconstructed representation of the original CSI feedback data is performed by applying a decoder portion of an autoencoder neural network to the obtained encoded representation of the original CSI feedback data to decompress and postprocess the obtained encoded representation of the original CSI feedback data. The decoder portion comprises a transformer with a multi-head attention block to improve decoding accuracy.

An example embodiment of an apparatus comprises means for carrying out a method according to any of the above-described example embodiments.

An example embodiment of a computer program comprises instructions for causing a decoder device to perform at least the following: obtaining a transmission bitstream from a radio transmission over a channel state information, CSI, feedback channel between a user device and a network node, the transmission bitstream comprising an encoded representation of massive multiple-input and multiple-output, MIMO, associated original CSI feedback data compressed and transmitted by the user device; and generating a reconstructed representation of the original CSI feedback data based on the obtained encoded representation of the original CSI feedback data. The generation of the reconstructed representation of the original CSI feedback data is performed by applying a decoder portion of an autoencoder neural network to the obtained encoded representation of the original CSI feedback data to decompress and postprocess the obtained encoded representation of the original CSI feedback data. The decoder portion comprises a transformer with a multi-head attention block to improve decoding accuracy.

An example embodiment of a radio receiver device comprises the decoder device according to any of the above-described example embodiments.

In an example embodiment, alternatively or in addition to the above-described example embodiments, the radio receiver device further comprises a dequantizer configured to dequantize the obtained encoded representation of the original CSI feedback data to produce input data for the decoder portion.

An example embodiment of a network node comprises the radio receiver device according to any of the above-described example embodiments.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
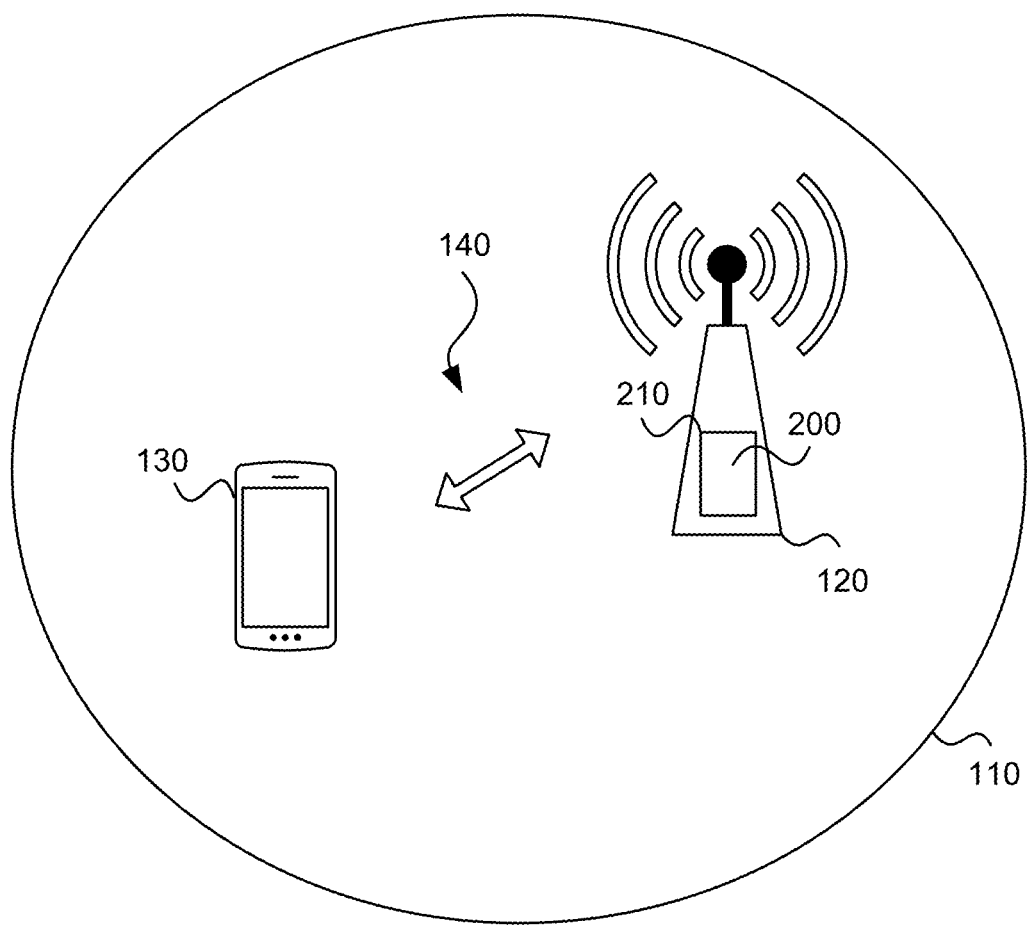
FIG. 1 shows an example embodiment of the subject matter described herein illustrating an example system, where various embodiments of the present disclosure may be implemented.

FIG. 1 illustrates example system 100, where various embodiments of the present disclosure may be implemented. The system 100 may comprise a fifth generation (5G) new radio (NR) network or a network beyond 5G wireless networks, 110. An example representation of system 100 is shown depicting network node device 120 and user device 130. At least in some embodiments, network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, network 110 may be configured to serve diverse service types and/or use cases, and it may logically be seen as comprising one or more networks.

User device 130 may include, e.g., a mobile phone, a smartphone, a tablet computer, a smart watch, or any handheld, portable and/or wearable device. User device 130 may also be referred to as a user equipment (UE). Network node device 120 may comprise, e.g., a base station. The base station may include, e.g., any device suitable for providing an air interface for user devices to connect to a wireless network via wireless transmissions. Furthermore, network node device 120 may comprise radio transmitter device 210. Furthermore, network node device 120 or radio transmitter device 210 may comprise decoder device 200 of FIG. 2.

In the following, various example embodiments will be discussed. At least some of these example embodiments described herein may allow a transformer-based decoder for channel state information compression.

Furthermore, at least some of the example embodiments described herein may allow a lightweight general purpose, high-fidelity, and data-driven decoder for channel state information (CSI) array compression associated with massive MIMO.

Furthermore, at least some of the example embodiments described herein may allow reducing uplink (UL) CSI feedback overhead and improving downlink (DL) throughput.

Furthermore, at least some of the example embodiments described herein may allow minimizing a decoder reconstruction error while maintaining a high decoder performance.

Furthermore, at least some of the example embodiments described herein may allow optimizing decoder parameters.

Furthermore, at least some of the example embodiments described herein may allow improving decoding accuracy.

Furthermore, at least some of the example embodiments described herein may allow minimizing decoder complexity while maintaining a high decoder performance.

Furthermore, at least some of the example embodiments described herein may allow supporting various ML-based encoders.

Figure 3:
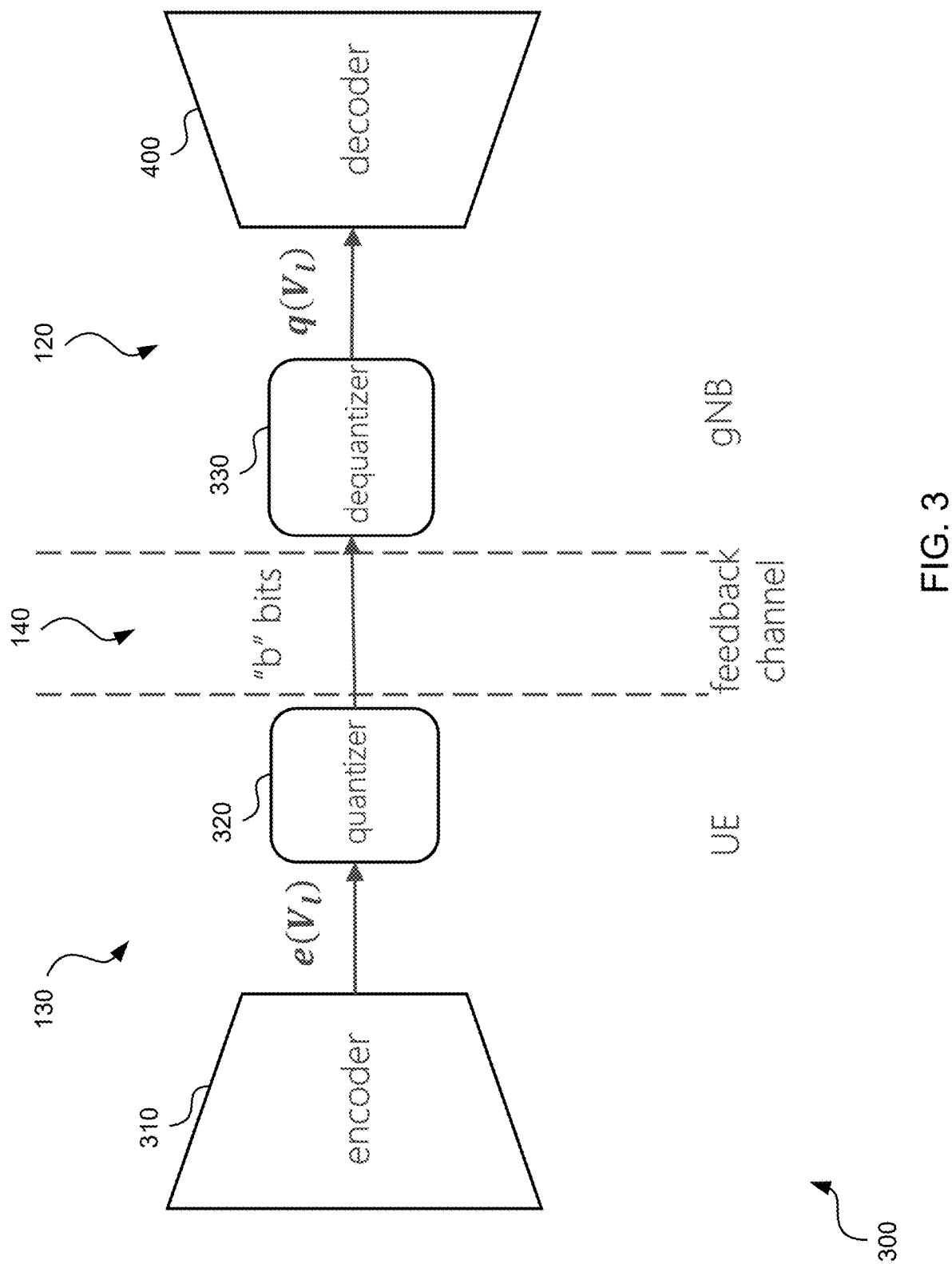
FIG. 3 shows an example embodiment of the subject matter described herein illustrating an example of an autoencoder neural network.

FIG. 3 illustrates an example of autoencoder neural network 300 in which various embodiments of the present disclosure may be implemented.

A data-driven, or artificial intelligence (AI)/machine learning (ML)-based CSI compression architecture may comprise an autoencoder 300 that learns key features of CSI feedback channel 140 through, e.g., hundreds of thousands to millions of representative samples and compresses instances for lower uplink overhead and better downlink throughput. In the disclosed autoencoder implementation, up to 13% mean user throughput gain may be achieved, and up to 22.5% cell-edge user throughput gain for a fixed overhead level may be achieved. This may amount to a reduction of ~200X in overhead bits compared with straightforward uncompressed or element-wise quantization.

A typical size of channel 140 as seen by user device 130 may be, e.g., {32 TX antennas×13 blocks of frequencies×4 layers×5 spectrum segments} complex values with a 16 to 32-bit floating point representation, and a typical feedback array, in the middle, may be 128 bits for each spectrum segment and each layer (overhead bits for a single layer eigenvector), thus achieving a raw compression ratio of 104× to 208×. A requirement is that a reconstructed channel at network node 120 includes key features of the channel, as observed by user device 130, for clear and efficient transmission to that user device 130 by network node 120. Reconstruction fidelity may be measured by, e.g., a squared generalized cosine similarity (SGCS) which ranges from 0 to 1, with 1 representing perfect reconstruction. Thus, there is a fidelity versus compression tradeoff curve and a goal of autoencoder 300 may include giving the lowest overhead for a given distortion/error value.

Autoencoder 300 may be trained on a large volume of channel 140 data called a training set $\{V_{l,n}\}$. Here, encoder $E_\theta$ portion 310 and decoder $D_\phi$ portion 400-pair parameters $\{\hat{\theta}, \hat{\phi}\}$ may be obtained, e.g., by a stochastic gradient method while minimizing an average reconstruction error over the training set of N samples: $10 \log(10) 1/N \Sigma_n f(V_{l,n}, \hat{V}_{l,n})$ where $\hat{V}_{l,n}$ represents the reconstruction of a CSI sample $V_{l,n}$, where n≤N, l=1, . . . , 4 and f(•, •) represents a chosen reconstruction error metric. The optimization of the weights can be repeated for each layer l to train separate models, or it can be done in one shot for a joint model.

Encoder $E_\theta$ portion 310 and decoder $D_\phi$ portion 400 may be trained sequentially with little or no effective penalty. In this case, decoder portion 400 parameters $\{\phi\}$ may be optimized over a training set comprising pairs $\{V_{l,n}, q(V_{l,n})\}$ where $q(V_{l,n})$ represents a compressed and quantized vector obtained from a trained encoder $E_\theta$ portion 310.

Conventionally, different vendors may use their own ML models for encoder and/or decoder which may lead to issues like an encoder-decoder architecture mismatch (e.g., CNN-transformer), thereby potentially leading to a large performance degradation. Thus, more than one ML model may be needed at user devices and network nodes to handle different use cases. There may also be hardware limitations which require an ML model to be simple and small in size (fewer layers and FLOPs) to meet a latency requirement. There may also be differences in supported operations between different ML hardware accelerators which may require different models to be used.

Accordingly, the disclosure is related to the design of a CSI channel compression decoder which is maximized for flexibility with respect to the encoder architecture and reconstruction performance and minimized for hardware complexity and footprint. The disclosed architecture exhibits its high performance and low complexity.

The disclosed architecture is lightweight and may involve, e.g., only approx. 80000-120000 parameters which, once trained on a variety of CSI feedback channels, may decode agnostically from an encoder architecture, meaning that training may be performed only on decoder portion 400 rather than end-to-end jointly with encoder portion 310.

Figure 2:
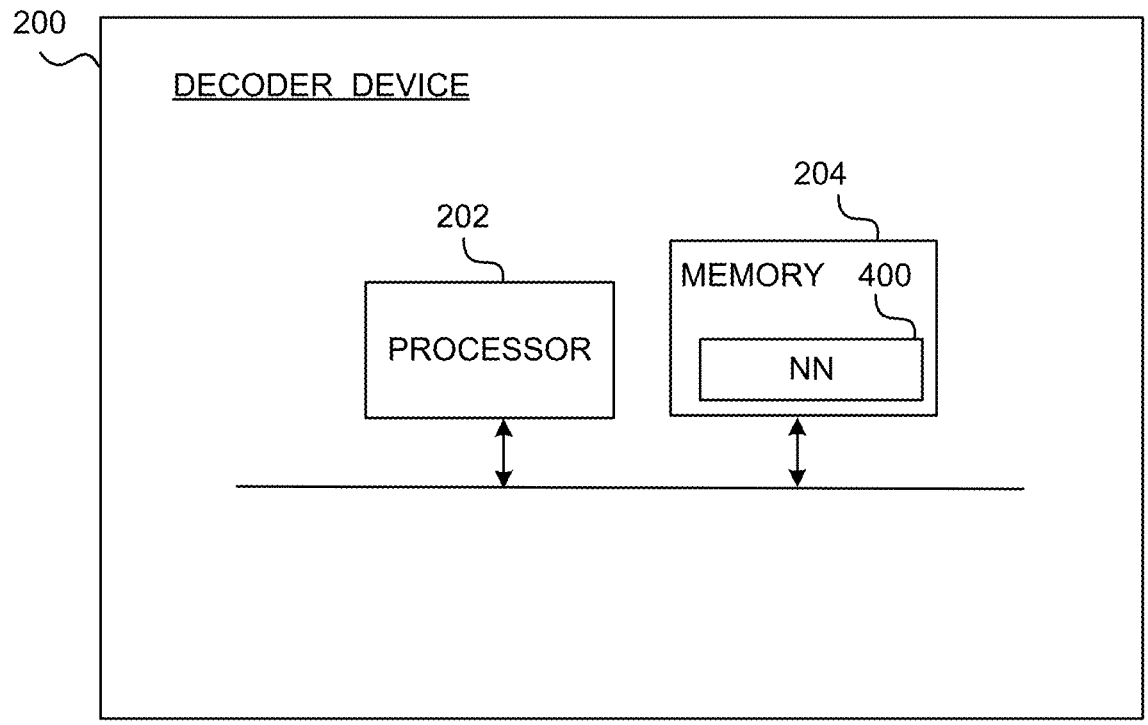
FIG. 2 shows an example embodiment of the subject matter described herein illustrating a decoder device.

FIG. 2 is a block diagram of decoder device 200, in accordance with an example embodiment. For example, decoder device 200 may be comprised in radio receiver device 210 which in turn may be comprised in network node 120.

Decoder device 200 comprises one or more processors 202 and one or more memories 204 that comprise computer program code. Decoder device 200 may also include other elements not shown in FIG. 2.

Although decoder device 200 is depicted to include only one processor 202, decoder device 200 may include more processors. In an embodiment, memory 204 is capable of storing instructions, such as an operating system and/or various applications. Furthermore, memory 204 may include a storage that may be used to store, e.g., at least some of the information and data used in the disclosed embodiments, such as decoder portion 400 of autoencoder neural network 300 described in more detail below.

Furthermore, processor 202 is capable of executing the stored instructions. In an embodiment, processor 202 may be embodied as a multi-core processor, a single core processor, or a combination of one or more multi-core processors and one or more single core processors. For example, processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, a tensor processing unit (TPU), a neural processing unit (NPU), or the like. In an embodiment, processor 202 may be configured to execute hard-coded functionality. In an embodiment, processor 202 is embodied as an executor of software instructions, wherein the instructions may specifically configure processor 202 to perform the algorithms and/or operations described herein when the instructions are executed.

Memory 204 may be embodied as one or more volatile memory devices, one or more non-volatile memory devices, and/or a combination of one or more volatile memory devices and non-volatile memory devices. For example, memory 204 may be embodied as semiconductor memories (such as mask ROM, PROM (programmable ROM), EPROM (erasable PROM), flash ROM, RAM (random access memory), etc.).

When executed by the at least one processor 202, instructions stored in at least one memory 204 cause decoder device 200 at least to obtain a transmission bitstream from a radio transmission over channel state information (CSI) feedback channel 140 between user device 130 and network node 120.

The transmission bitstream comprises an encoded representation of massive MIMO associated original CSI feedback data compressed and transmitted by user device 130.

The instructions, when executed by at least one processor 202, further cause decoder device 200 at least to generate a reconstructed representation of the original CSI feedback data based on the obtained encoded representation of the original CSI feedback data.

The generation of the reconstructed representation of the original CSI feedback data is performed by applying decoder portion 400 of autoencoder neural network 300 (which may have already been trained on samples of one or more user device encoders 310) to the obtained encoded representation of the original CSI feedback data to decompress and postprocess the obtained encoded representation of the original CSI feedback data. Decoder portion 400 comprises transformer 420 with multi-head attention block 422 to improve decoding accuracy.

Figure 4:
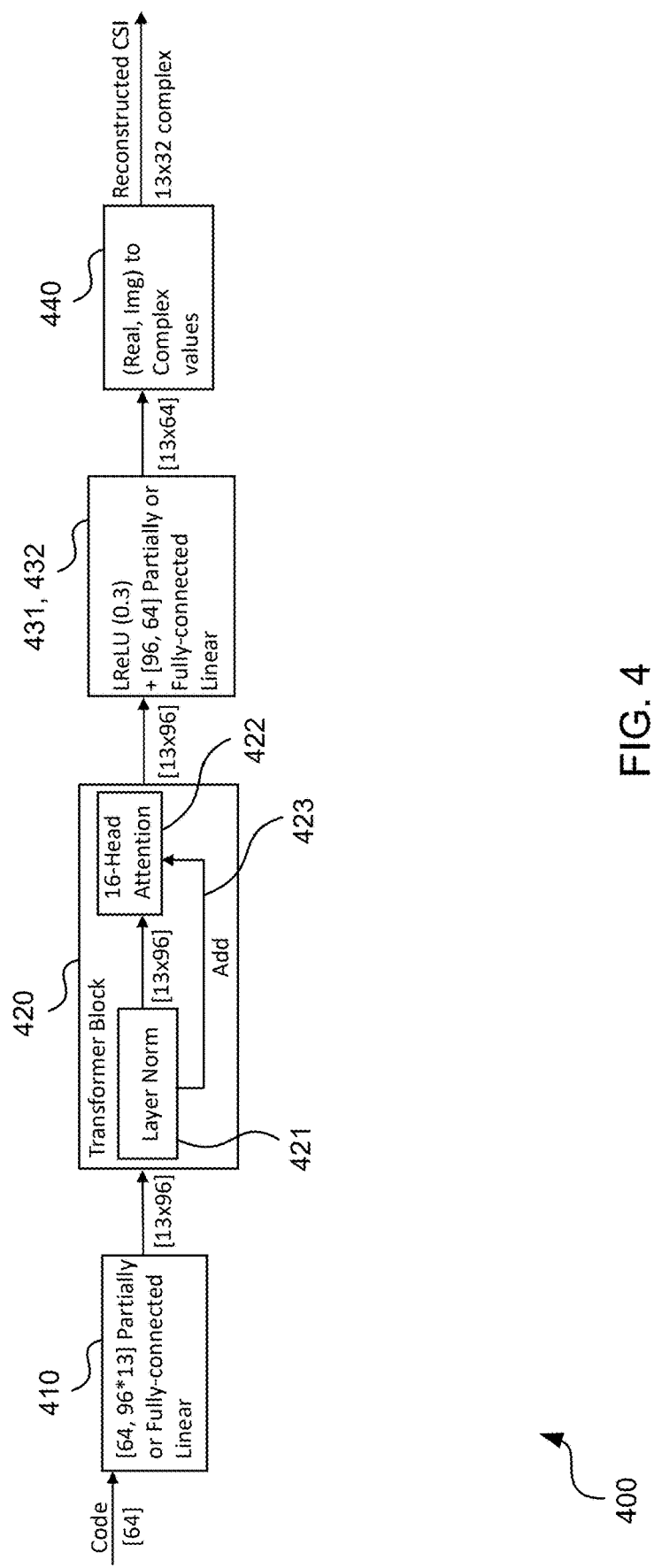
FIG. 4 shows an example embodiment of the subject matter described herein illustrating an example of a decoder portion of an autoencoder neural network.

FIG. 4 illustrates an example of disclosed decoder portion 400 of autoencoder neural network 300.

At least in some embodiments, decoder portion 400 may further comprise partially or fully connected first linear layer 410 before transformer 420, configured to reshape input data of decoder portion 400 and generate linear embeddings for transformer 420.

At least in some embodiments, radio receiver device 210 may further comprise dequantizer 330 configured to dequantize the obtained encoded representation of the original CSI feedback data to produce the input data for decoder portion 400.

For example, the input to decoder portion 400 may include a codeword of 64 real values, denoted $q(V_l)$, that may be obtained by passing feedback bits b through dequantizer 330 (corresponding to quantizer 320 at user device 130 side). For example, a scalar dequantizer may take each pair of bits from a message of length 128 bits and produce a corresponding real value by selecting one of four codebook elements.

At least in some embodiments, transformer 420 may comprise layer normalization block 421.

At least in some embodiments, transformer 420 may further comprise residual skip connection 423 from an output of first linear layer 410 to an output of multi-head attention block 422.

At least in some embodiments, decoder portion 400 may further comprise non-linear activation function 431 after transformer 420, such as a leaky rectified linear unit (ReLU).

At least in some embodiments, decoder portion 400 may further comprise partially or fully connected second linear layer 432 after transformer 420, configured to reshape the output data of decoder portion 400.

At least in some embodiments, decoder portion 400 may further comprise post-processing function 440 after second linear layer 432, configured to convert real and imaginary values to complex values, e.g., to obtain an output matrix containing 13×32 complex values.

At least in some embodiments, the instructions, when executed by at least one processor 202, may further cause decoder device 200 to train decoder portion 400 of autoencoder neural network 300 using data collected from multiple different encoder portions 310 (at least some of which may be from different user devices 130) of autoencoder neural network 300 as training data.

Figure 5:
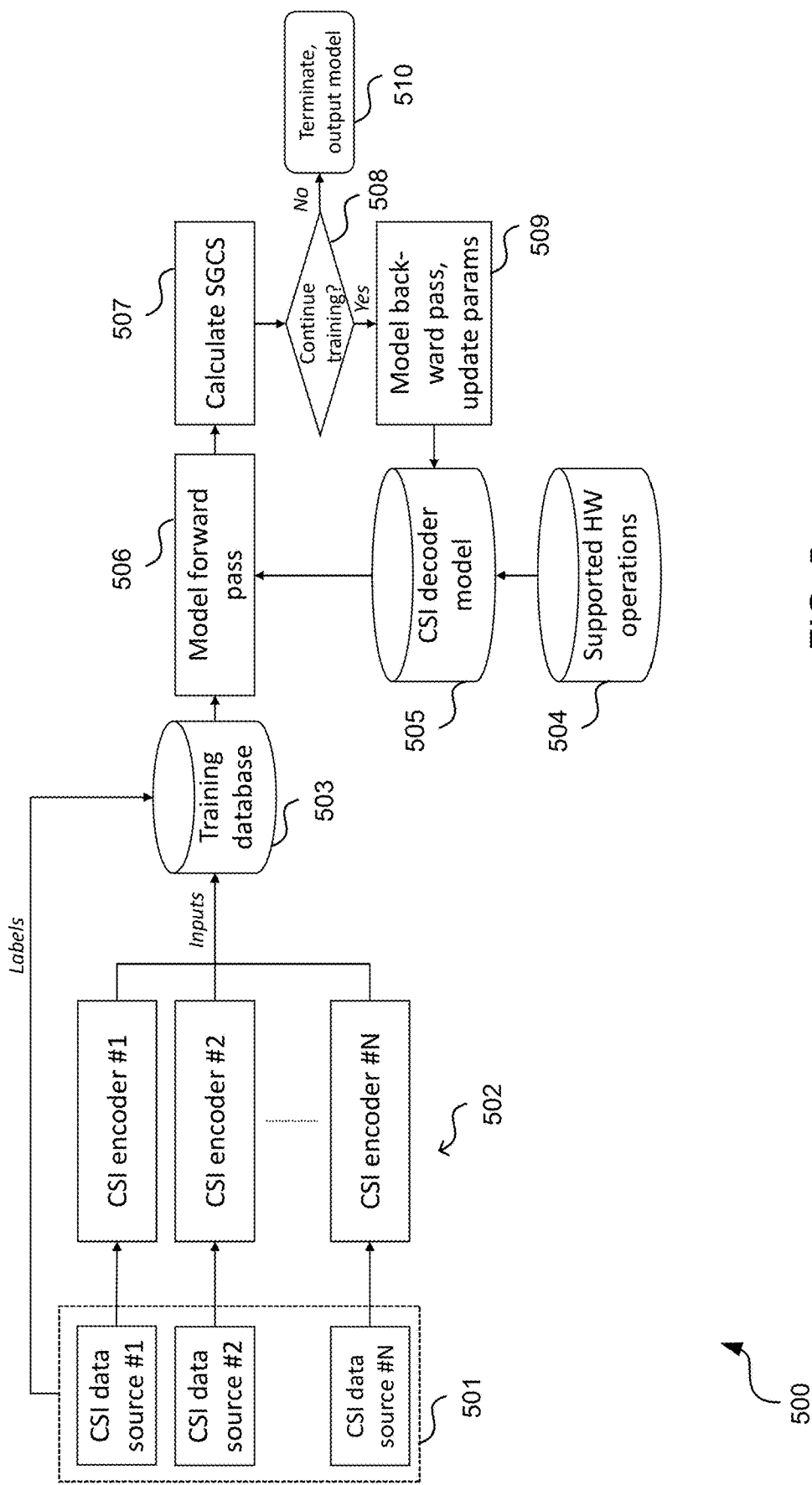
FIG. 5 shows an example embodiment of the subject matter described herein illustrating an example of training a decoder portion of an autoencoder neural network.

Diagram 500 of FIG. 5 illustrates an example of training decoder portion 400 of autoencoder neural network 300. Diagram 500 includes CSI data sources 501, one or more CSI encoders 502, training database 503 comprising of a collection of $\{V_{l,n}, q(V_{l,n})\}$ pairs from each encoder, supported hardware operations 504, CSI decoder model 505 with parameters to be trained, model forward pass 506 which passes the training data from database 503 through CSI decoder model 505 to obtain a reconstructed CSI $\hat{V}_l$, SGCS calculation block 507 that calculates the squared cosine similarity between the original CSI $V_l$ and the reconstructed CSI $\hat{V}_l$, training continuation decision block 508 to determine if trained parameters give satisfactory reconstruction accuracy, model backward pass and update parameters when training is to be continued due to low reconstruction accuracy in block 509, and terminate and output model in block 510.

At least in some embodiments, the instructions, when executed by at least one processor 202, may further cause decoder device 200 to obtain a unique label of encoder portion 310 of autoencoder neural network 300 as an additional input to decoder portion 400.

In other words, the disclosed training arrangement may take into account different ML encoders, as well as hardware limitations. The disclosed training arrangement may collect data from different CSI encoders and train the model to be able to decode the CSI feedback from all of these encoders. In some example embodiments, an encoder ID may be provided as an additional input to the decoder model. At least in some embodiments, the decoder model may be constructed by using only hardware supported operations.

In summary, the disclosure may provide, e.g., at least some of the following advantages:
- ML-based decoder portion 400 may use an architecture based on multi-head attention transformer to achieve improved decoding accuracy,
- ML-based decoder portion 400 may be minimized for complexity while maintaining high performance (low reconstruction error),
- ML-based decoder portion 400 may support different ML-based encoders when trained on data sets with sufficient samples $\{V_{l,n}, q(V_{l,n})\}$ from these encoders, and
- at least in some embodiments, an encoder identification may be provided as an input to decoder portion 400 for lower reconstruction error.

Figure 6:
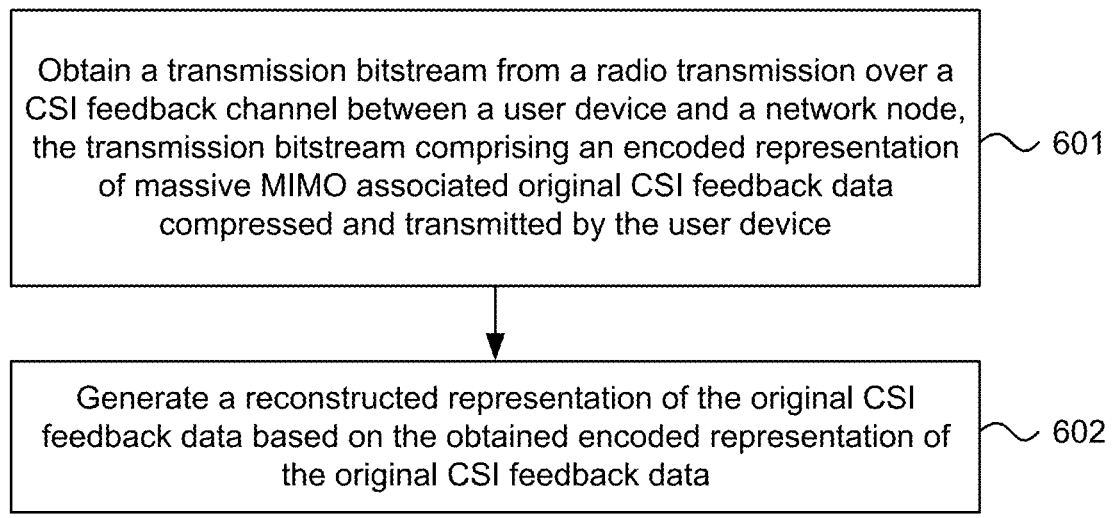
FIG. 6 shows an example embodiment of the subject matter described herein illustrating a disclosed method for a decoder device.

FIG. 6 illustrates an example flow chart of method 600 for decoder device 200, in accordance with an example embodiment.

At operation 601, decoder device 200 obtains the transmission bitstream from the radio transmission over CSI feedback channel 140 between user device 130 and network node 120. As discussed above in more detail, the transmission bitstream comprises the encoded representation of the massive MIMO associated original CSI feedback data compressed and transmitted by user device 130.

At operation 602, decoder device 200 generates the reconstructed representation of the original CSI feedback data based on the obtained encoded representation of the original CSI feedback data. As discussed above in more detail, the generation of the reconstructed representation of the original CSI feedback data is performed by applying decoder portion 400 of autoencoder neural network 300 to the obtained encoded representation of the original CSI feedback data to decompress and postprocess the obtained encoded representation of the original CSI feedback data. Decoder portion 400 comprises transformer 420 with multi-head attention block 422 to improve decoding accuracy.

Embodiments and examples with regard to FIG. 6 may be carried out by decoder device 200 of FIG. 2. Operations 601-602 may, for example, be carried out by at least one processor 202 and at least one memory 204. Further features of method 600 directly resulting from the functionalities and parameters of decoder device 200 are not repeated here. Method 600 can be carried out by computer programs or portions thereof.

Another example of an apparatus suitable for carrying out the embodiments and examples with regard to FIG. 6 comprises means for:

obtaining, at operation 601, the transmission bitstream from the radio transmission over CSI feedback channel 140 between user device 130 and network node 120, the transmission bitstream comprising the encoded representation of the massive MIMO associated original CSI feedback data compressed and transmitted by user device 130; and generating, at operation 602, the reconstructed representation of the original CSI feedback data based on the obtained encoded representation of the original CSI feedback data, the generation of the reconstructed representation of the original CSI feedback data being performed by applying decoder portion 400 of autoencoder neural network 300 to the obtained encoded representation of the original CSI feedback data to decompress and postprocess the obtained encoded representation of the original CSI feedback data, and decoder portion 400 comprising transformer 420 with multi-head attention block 422 to improve decoding accuracy.

The functionality described herein can be performed, at least in part, by one or more computer program product components such as software components. According to an embodiment, decoder device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Tensor Processing Units (TPUs), and Graphics Processing Units (GPUs).

In the disclosed example embodiments, it may be possible to train one ML model/NN with a specific architecture, then derive another ML model/NN from that using processes such as compilation, pruning, quantization or distillation. The ML model/NN may be executed using any suitable apparatus, for example a CPU, GPU, ASIC, FPGA, compute-in-memory, analog, or digital, or optical apparatus. It is also possible to execute the ML model/NN in an apparatus that combines features from any number of these, for instance digital-optical or analog-digital hybrids. In some examples, weights and required computations in these systems may be programmed to correspond to the ML model/NN. In some examples, the apparatus may be designed and manufactured so as to perform the task defined by the ML model/NN so that the apparatus is configured to perform the task when it is manufactured without the apparatus being programmable as such.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A decoder device, comprising:
at least one processor; and
at least one memory storing instructions that, when executed by the at least one processor, cause the decoder device at least to:
obtain a transmission bitstream from a radio transmission over a channel state information, CSI, feedback channel between a user device and a network node, the transmission bitstream comprising an encoded representation of massive multiple-input and multiple-output, MIMO, associated original CSI feedback data compressed and transmitted by the user device; and
generate a reconstructed representation of the original CSI feedback data based on the obtained encoded representation of the original CSI feedback data,
wherein the generation of the reconstructed representation of the original CSI feedback data is performed by applying a decoder portion of an autoencoder neural network to the obtained encoded representation of the original CSI feedback data to decompress and postprocess the obtained encoded representation of the original CSI feedback data, the decoder portion comprising a transformer with a multi-head attention block to improve decoding accuracy, and
wherein the decoder portion further comprises a partially connected first linear layer before the transformer, configured to reshape input data of the decoder portion and generate linear embeddings for the transformer, and wherein the decoder portion further comprises a partially connected second linear layer after the transformer, configured to reshape output data of the decoder portion.

2. The decoder device according to claim 1, wherein the transformer comprises a layer normalization block.

3. The decoder device according to claim 1, wherein the transformer further comprises a residual skip connection from an output of the first linear layer to an output of the multi-head attention block.

4. The decoder device according to claim 1, wherein the decoder portion further comprises a non-linear activation function after the transformer.

5. The decoder device according to claim 1, wherein the decoder portion further comprises a postprocessing function after the second linear layer, configured to convert real and imaginary values to complex values.

6. The decoder device according to claim 1, wherein the instructions, when executed by the at least one processor, further cause the decoder device to train the decoder portion of the autoencoder neural network using data collected from multiple different encoder portions of the autoencoder neural network as training data.

7. The decoder device according to claim 1, wherein the instructions, when executed by the at least one processor, further cause the decoder device to obtain a unique label of an encoder portion of the autoencoder neural network as an additional input to the decoder portion.

8. A radio receiver device, comprising the decoder device according to claim 1.

9. The radio receiver device according to claim 8, further comprising a dequantizer configured to dequantize the obtained encoded representation of the original CSI feedback data to produce input data for the decoder portion.

10. A network node comprising the radio receiver device according to claim 8.

11. A method, comprising:
  obtaining, by a decoder device, a transmission bitstream from a radio transmission over a channel state information, CSI, feedback channel between a user device and a network node, the transmission bitstream comprising an encoded representation of massive multiple-input and multiple-output, MIMO, associated original CSI feedback data compressed and transmitted by the user device; and
  generating, by the decoder device, a reconstructed representation of the original CSI feedback data based on the obtained encoded representation of the original CSI feedback data,
  wherein the generation of the reconstructed representation of the original CSI feedback data is performed by applying a decoder portion of an autoencoder neural network to the obtained encoded representation of the original CSI feedback data to decompress and postprocess the obtained encoded representation of the original CSI feedback data, the decoder portion comprising a transformer with a multi-head attention block to improve decoding accuracy, and
  wherein the decoder portion further comprises a partially connected first linear layer before the transformer, configured to reshape input data of the decoder portion and generate linear embeddings for the transformer, and wherein the decoder portion further comprises a partially connected second linear layer after the transformer, configured to reshape output data of the decoder portion.

12. A non-Transitory computer readable medium comprising instructions for causing a decoder device to perform at least the following:
  obtaining a transmission bitstream from a radio transmission over a channel state information, CSI, feedback channel between a user device and a network node, the transmission bitstream comprising an encoded representation of massive multiple-input and multiple-output, MIMO, associated original CSI feedback data compressed and transmitted by the user device; and
  generating a reconstructed representation of the original CSI feedback data based on the obtained encoded representation of the original CSI feedback data, wherein the generation of the reconstructed representation of the original CSI feedback data is performed by applying a decoder portion of an auto-encoder neural network to the obtained encoded representation of the original CSI feedback data to decompress and postprocess the obtained encoded representation of the original CSI feedback data, the decoder portion comprising a transformer with a multi-head attention block to improve decoding accuracy, and
  wherein the decoder portion further comprises a partially connected first linear layer before the transformer, configured to reshape input data of the decoder portion and generate linear embeddings for the transformer, and wherein the decoder portion further comprises a partially connected second linear layer after the transformer, configured to reshape output data of the decoder portion.

* * * * *